US007938143B2

(12) United States Patent
Nagasaki et al.

(10) Patent No.: US 7,938,143 B2
(45) Date of Patent: May 10, 2011

(54) FLUID PRESSURE CONTROL APPARATUS

(75) Inventors: Kanehisa Nagasaki, Ichinomiya (JP); Ryo Ishibashi, Kariya (JP)

(73) Assignee: Denso Corporation, Kariya (JP)

( * ) Notice: Subject to any disclaimer, the term of this patent is extended or adjusted under 35 U.S.C. 154(b) by 984 days.

(21) Appl. No.: 11/798,994

(22) Filed: May 18, 2007

(65) Prior Publication Data

US 2007/0267077 A1   Nov. 22, 2007

(30) Foreign Application Priority Data

May 19, 2006   (JP) ................................. 2006-140238

(51) Int. Cl.
*F16K 11/07* (2006.01)
(52) U.S. Cl. ............................. 137/625.68; 137/625.65
(58) Field of Classification Search ............. 137/625.65, 137/625.64, 625.68, 625.69; 251/129.01
See application file for complete search history.

(56) References Cited

U.S. PATENT DOCUMENTS

| | | | | |
|---|---|---|---|---|
| 4,155,535 A * | 5/1979 | Seamone | .................. | 137/625.3 |
| 4,615,358 A * | 10/1986 | Hammond et al. | ....... | 137/625.63 |
| 4,971,116 A * | 11/1990 | Suzuki et al. | ........... | 137/625.65 |
| 5,004,440 A * | 4/1991 | Suzuki | ..................... | 137/625.65 |
| 5,014,747 A * | 5/1991 | Suzuki et al. | ........... | 137/625.65 |
| 5,031,663 A * | 7/1991 | Fukuta et al. | ............ | 137/625.64 |
| 5,186,204 A * | 2/1993 | Oka et al. | ................. | 137/625.65 |
| 5,197,507 A * | 3/1993 | Miki et al. | ............... | 137/625.65 |
| 5,247,965 A * | 9/1993 | Oka et al. | ................. | 137/625.65 |
| 5,259,414 A * | 11/1993 | Suzuki | ..................... | 137/625.65 |
| 5,771,932 A * | 6/1998 | Cho et al. | ................. | 137/625.69 |
| 5,799,697 A * | 9/1998 | Sakaguchi et al. | ....... | 137/625.65 |
| 5,848,613 A * | 12/1998 | Sakaguchi et al. | ....... | 137/625.65 |
| 5,868,167 A * | 2/1999 | Miki et al. | ............... | 137/625.65 |
| 5,947,155 A * | 9/1999 | Miki et al. | ............... | 137/625.65 |
| 6,179,005 B1 * | 1/2001 | Inami | ...................... | 137/625.65 |
| 6,408,883 B2 * | 6/2002 | Motoki et al. | ........... | 137/625.64 |
| 6,615,868 B2 * | 9/2003 | Ueki | .......................... | 137/625.3 |
| 6,615,869 B2 * | 9/2003 | Sudani et al. | ............ | 137/625.64 |
| 2001/0009164 A1 * | 7/2001 | Motoki et al. | ........... | 137/625.65 |
| 2002/0134443 A1 * | 9/2002 | Sudani et al. | ............ | 137/625.65 |
| 2008/0257433 A1 * | 10/2008 | Tsujimoto | ................ | 137/625.64 |

FOREIGN PATENT DOCUMENTS

| | | |
|---|---|---|
| JP | 6-80079 | 11/1994 |
| JP | 2002-122250 | 4/2002 |
| JP | 2002-357281 | 12/2002 |
| JP | 2006-046640 | 2/2006 |

OTHER PUBLICATIONS

Japanese Office Action dated Nov. 9, 2010, issued in corresponding Japanese Application No. 2006-140238 with English Translation.

* cited by examiner

*Primary Examiner* — Stephen M Hepperle
*Assistant Examiner* — Craig Price
(74) *Attorney, Agent, or Firm* — Nixon & Vanderhye PC

(57) ABSTRACT

In an electromagnetic hydraulic pressure control valve of an N/L type, an electromagnetic actuator provides a force to a spool, which is slidably received in a valve housing, in a valve opening direction for opening an input port of the valve housing. A return spring provides a force to the spool in the valve closing direction. A constriction is provided to constrict a flow passage cross sectional area in a fluid passage, which extends from the input port to a hydraulic servo. A negative pressure port opens in a direction generally perpendicular to a flow direction of a fluid at a location, at which a fluid velocity of the fluid is accelerated by the constriction. A negative pressure guide passage communicates between the negative pressure port and a feedback chamber defined in the valve housing.

6 Claims, 8 Drawing Sheets

FLUID PRESSURE CONTROL APPARATUS

CROSS REFERENCE TO RELATED APPLICATION

This application is based on and incorporates herein by reference Japanese Patent Application No. 2006-140238 filed on May 19, 2006.

BACKGROUND OF THE INVENTION

1. Field of the Invention

The present invention relates to a fluid pressure control apparatus, which controls a fluid pressure at a control subject chamber.

2. Description of Related Art

In the following description, "valve closing" refers to closing of an input port of a valve housing. Furthermore, "valve opening" refers to opening of the input port.

Japanese Unexamined Patent Publication No. 2006-046640 discloses an electromagnetic hydraulic pressure control valve as an example of the fluid pressure control apparatus.

The electromagnetic hydraulic pressure control valve, which is disclosed in Japanese Unexamined Patent Publication No. 2006-046640, will be described with reference to FIGS. 8A and 8B. In the following description, components similar to those of embodiments of the present invention, will be indicated by the same numerals.

The electromagnetic hydraulic pressure control valve 10 shown in FIG. 8A is of a normally low (N/L) type, i.e., a positive logic type or a normally closed type. The electromagnetic hydraulic pressure control valve 10 of the N/L type includes a spool valve 13 and an electromagnetic actuator 15. The spool valve 13 includes a spool 12, which is urged in a valve closing direction by a return spring 14. The electromagnetic actuator 15 drives the spool 12 in a valve opening direction against the urging force of the return spring 14.

In the electromagnetic hydraulic pressure control valve 10 of the N/L type, the return spring 14 serves as a valve closing direction drive means, and the electromagnetic actuator 15 serves as a valve opening direction drive means.

The electromagnetic hydraulic pressure control valve 10 shown in FIG. 8B is of a normally high (N/H) type, i.e., a negative logic type or a normally open type. The electromagnetic hydraulic pressure control valve 10 of the N/H type includes the spool valve 13 and the electromagnetic actuator 15. The spool valve 13 includes the spool 12, which is urged in the valve opening direction by the return spring 14. The electromagnetic actuator 15 drives the spool 12 in the valve closing direction against the urging force of the return spring 14.

In the electromagnetic hydraulic pressure control valve 10 of the N/H type, the return spring 14 serves as the valve opening direction drive means, and the electromagnetic actuator 15 serves as the valve closing direction drive means.

In both of the N/L type and the N/H type, notches 39 are formed in at least one of an input seal land 23 of the spool 12 and a valve housing 11 to open the input port 17 in a small amount.

In FIGS. 8A to 9C, although the notch 39 is provided in the input seal land 23 of the spool 12, the notch 39 may be provided in the valve housing 11 in some cases.

The disadvantages of the above prior art will be described with reference to the electromagnetic hydraulic pressure control valve 10 of the N/L type.

The spool 12 receives a force (hereinafter, referred to as a valve closing spring force), which is applied from the return spring 14, and a force (hereinafter, referred to as a feedback valve closing force), which is applied due to a pressure increase in a feedback chamber 27. Here, at the time of valve closing, the output hydraulic pressure is not generated in the feedback chamber 27. Furthermore, right after the valve opening, the hydraulic pressure of the control subject chamber is still increasing, so that the output hydraulic pressure is not substantially generated in the feedback chamber 27.

When the input seal land 23 is moved from the valve closing state to communicate between the input port 17 and the output chamber 25, the notch 39 is opened first. Thereby, as indicated by an arrow a in FIG. 9A, a high velocity oil flow passes through the notch 39 (the small gap between the input seal land 23 and the input port 17).

The flow direction, which is indicated by the arrow a in FIG. 9A, is the axial valve closing direction, so that the high velocity oil flow, which passes through the notches 39, provides a fluid reaction force (see an arrow $\beta$ in FIG. 8A or 8B) that acts as a valve closing force on the spool 12 at a location X in FIG. 9A.

Furthermore, the high velocity oil flow, which is supplied into the output chamber 25 through the notches 39, impinges against an effluent seal land 24 of the spool 12 to provide a fluid reaction force (see the arrow $\beta$ in FIG. 8A or 8B) that acts as the valve closing force on the spool 12 at a location Y in FIG. 9A.

As described above, right after the valve opening, the fluid reaction force ($\beta$) is applied to the spool 12 to push back the spool 12 in the valve closing direction, so that the pressure increase at the output port 18 is disadvantageously limited, and thereby the good response cannot be obtained.

Furthermore, in order to obtain the good response, the electromagnetic actuator 15 needs to generate a reaction force canceling drive force (see an arrow $\beta'$ in FIG. 8A), which overcomes the fluid reaction force ($\beta$), right after the valve opening.

Thus, the required valve opening drive force (see an arrow $\gamma$ in FIG. 8A) of the electromagnetic actuator 15 is disadvantageously increased. Thereby, the size of the magnetic circuit of the electromagnetic actuator 15 needs to be increased, and the electric power saving of the electromagnetic actuator 15 is limited.

Particularly, in the recent years, the supply hydraulic pressure tends to be increased to cause an increase in the fluid reaction force (the valve closing force). Thus, the size of the electromagnetic actuator 15 tends to be increased, and the electric power consumption of the electromagnetic actuator 15 tends to be increased.

Here, although the disadvantages of the electromagnetic hydraulic pressure control valve 10 of the N/L type have been described, the electromagnetic hydraulic pressure control valve 10 of the N/H type also have the disadvantage of the applying the fluid reaction force (the valve closing force) to the spool 12 right after the valve opening.

SUMMARY OF THE INVENTION

The present invention addresses the above disadvantages. Thus, it is an objective of the present invention to provide a fluid pressure control apparatus that enables a reduction in a fluid reaction force (a valve closing force), which is applied to a spool right after valve opening of an input port.

To achieve the objective of the present invention, there is provided a fluid pressure control apparatus, which includes a spool valve, a valve opening direction drive means, a valve closing direction drive means, a negative pressure generating means and a negative pressure guide passage. The spool valve includes a valve housing, a spool and a feedback chamber. The valve housing has an input port and an output port. The input port receives a supply of fluid, and the output port is communicated with a control subject chamber. The spool is movably supported in the valve housing and includes an input seal land, which opens and closes the input port in response to movement of the spool. The feedback chamber provides a force to the spool in a valve closing direction for closing the input port upon increasing of a pressure in the feedback chamber. The valve opening direction drive means is for providing a force to the spool in a valve opening direction for opening the input port. The valve closing direction drive means is for providing a force to the spool in the valve closing direction for closing the input port. The negative pressure generating means is for generating a negative pressure through use of a fluid velocity of fluid in a fluid passage, which extends from the input port to the control subject chamber. The negative pressure guide passage guides the negative pressure, which is generated by the negative pressure generating means, to the feedback chamber.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

Figure 1:
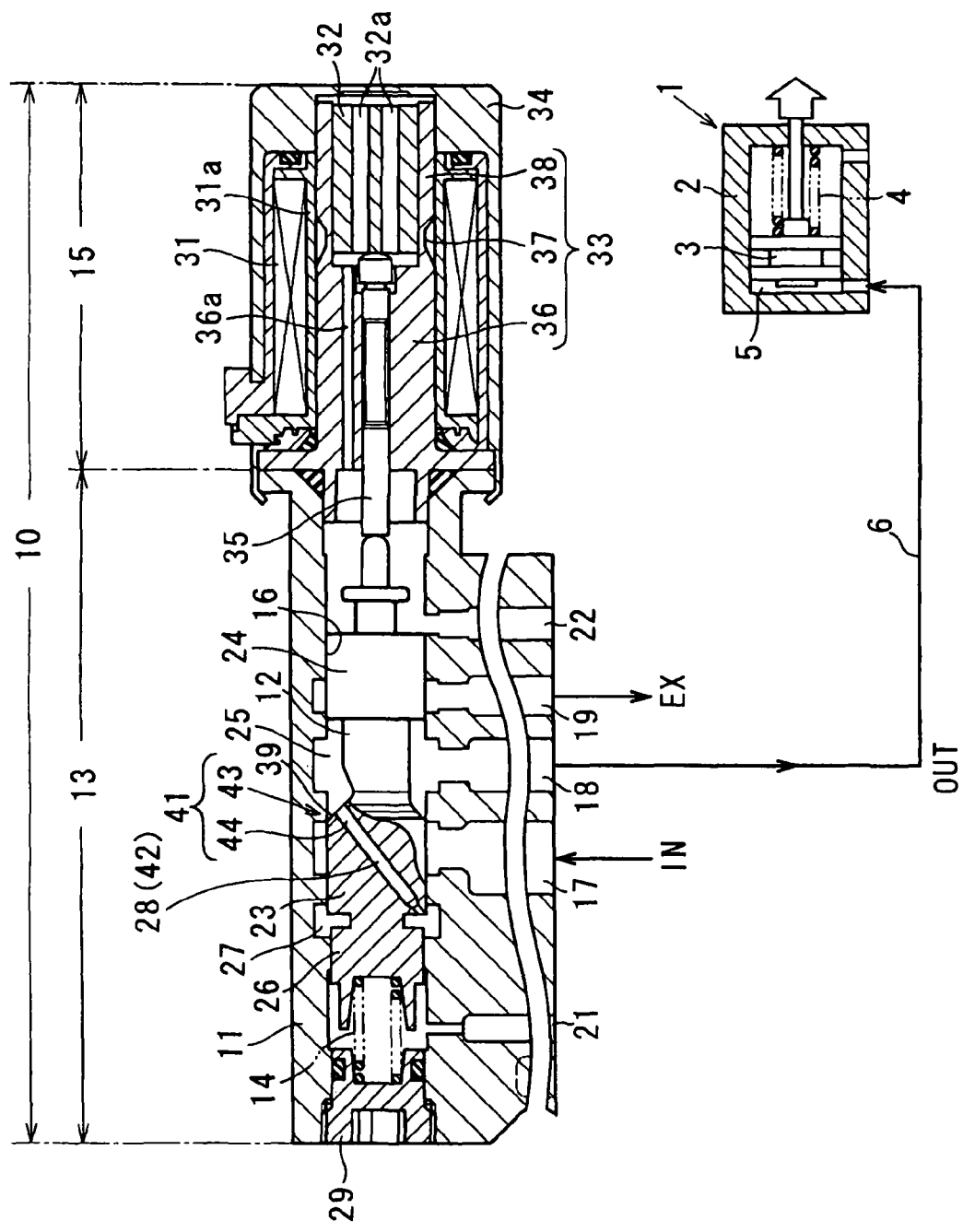
FIG. 1 is a schematic diagram showing a hydraulic pressure control apparatus according to a first embodiment of the present invention.

A first embodiment according to the present invention will be described with reference to FIGS. 1 to 4C. In the first embodiment, a fluid pressure control apparatus of the present invention is implemented as a hydraulic pressure (oil pressure) control apparatus, which controls a hydraulic pressure (oil pressure) in an automatic transmission.

In the following description of the first embodiment, a basic structure of the hydraulic pressure control apparatus will be described first, and then characteristics of the hydraulic pressure control apparatus will be described thereafter.

(Basic Structure of Hydraulic Pressure Control Apparatus)

The automatic transmission includes a plurality of friction engaging devices (e.g., a multi-plate hydraulic clutch, a multi-plate hydraulic brake) and the hydraulic pressure control apparatus. The friction engaging devices change an output rotational ratio and a rotational direction of an engine, which generates an output for driving a vehicle. The hydraulic pressure control apparatus controls engagement and disengagement of each friction engaging device.

Each friction engaging device includes friction elements (e.g., multiple plates) and a hydraulic actuator 1. The hydraulic actuator 1 executes engagement and disengagement of the friction elements.

The hydraulic actuator 1 of the friction engaging device includes a housing 2, a piston 3 and a return spring 4. The housing 2 forms a cylinder chamber. The piston 3 is movably supported in the cylinder chamber to engage and disengage the friction elements. The return spring 4 urges the piston 3 in a disengaging direction for disengaging the friction elements.

When a hydraulic pressure of a hydraulic servo 5 (an example of a control subject chamber), which is defined by the piston 3 in the cylinder chamber, increases, the piston 3 causes the engagement of the friction elements. When the hydraulic pressure of the hydraulic servo 5 decreases, the engagement of the friction elements, which is caused by the piston 3, is released to disengage the friction elements.

A supplied hydraulic pressure of each hydraulic servo 5 is controlled by an electromagnetic hydraulic pressure control valve 10 through an output passage 6.

(Description of Electromagnetic Hydraulic Pressure Control Valve)

The electromagnetic hydraulic pressure control valve 10 is of an N/L type and includes a valve housing 11 (e.g., a housing that is a cylindrical sleeve and forms a hydraulic circuit), a spool valve 13, a return spring 14 (corresponding to a valve closing direction drive means in the electromagnetic hydraulic pressure control valve 10 of the N/L type) and an electromagnetic actuator 15 (corresponding to a valve opening direction drive means of the electromagnetic hydraulic pressure control valve 10 of the N/L type). The spool valve 13 includes a spool 12. The return spring 14 urges the spool 12 in a valve closing direction (a right direction in FIG. 1). The electromagnetic actuator 15 applies an axial force to the spool 12 in a valve opening direction (a left direction in FIG. 1).

(Description of Valve Housing 11)

The valve housing 11 may be a circuit housing or a generally cylindrical sleeve. In the case of the circuit housing, the valve housing 11 forms a hydraulic circuit. In the case of the sleeve, the valve housing 11 is received in the circuit housing. In the first, third and fourth embodiments, the valve housing 11 is formed as the circuit housing. In the second embodiment, the valve housing 11 is formed as the sleeve, which is received in the circuit housing.

The valve housing 11 includes a receiving hole 16, an input port 17, an output port 18 and an effluent port 19. The receiving hole 16 axially slidably supports the spool 12. The input port 17 is communicated with an oil pump (an undepicted hydraulic pressure generating means) through, for example, an oil passage. The output port 18 is communicated with the hydraulic servo 5 through the output passage 6. The effluent port 19 is communicated with a low pressure side (e.g., an oil pan).

The oil ports, such as the input port 17, the output port 18 and the effluent port 19, are formed along an inner peripheral surface of the receiving hole 16. More specifically, a spring chamber side drain port 21, the input port 17, the output port 18, the effluent port 19 and an electromagnetic actuator 15 side drain port 22 are arranged in this order from the left side to the right side in FIG. 1 along the inner peripheral surface of the receiving hole 16.

(Description of Spool 12)

The spool 12 is axially slidably received in the receiving hole 16 and includes an input seal land 23 and an effluent seal land 24. The input seal land 23 seals the input port 17, and the effluent seal land 24 seals the effluent port 19. In the valve housing 11, an output chamber (a distribution chamber) 25 is formed between the input seal land 23 and the effluent seal land 24 and is always communicated with the output port 18.

The spool 12 further includes a feedback land 26 and a feedback chamber 27. The feedback land 26 is arranged on a left side of the input seal land 23 in FIG. 1 and has an outer diameter smaller than an outer diameter of the input seal land 23. The feedback chamber 27 is formed between the input seal land 23 and the feedback land 26.

A feedback port 28, which communicates between the output chamber 25 and the feedback chamber 27, is formed in the spool 12 and generates a feedback hydraulic pressure in consistent with the output pressure. A feedback orifice is provided in the feedback port 28 to generate an appropriate feedback hydraulic pressure in the feedback chamber 27.

At the time of generating the output pressure, when a hydraulic pressure (an output pressure), which is applied to the feedback chamber 27, increases to increase a pressure difference between the input seal land 23 and the feedback land 26 due to a land difference therebetween, a feedback valve closing force (a force in a valve closing direction) is generated at the spool 12. In this way, a displacement of the spool 12 at the time of generating the output pressure is stabilized to limit a change in the output pressure caused by a change in an input pressure.

(Description of Return Spring 14)

The return spring 14 is a coil spring, which is spirally wound to apply a valve closing spring force (a force in the valve closing direction) and is placed in a compressed state in a spring chamber at a left side of the receiving hole 16 in FIG. 1. One end of the return spring 14 abuts against a bottom surface of an adjuster screw 29, which is threadably engaged with and closes a left end of the receiving hole 16 in FIG. 1, and the other end of the return spring 14 abuts against an end of the spool 12. By adjusting an amount of thread engagement of the adjuster screw 29 with the left end of the receiving hole 16 in FIG. 1, the valve closing force of the return spring 14 can be adjusted.

The spool 12 is held at a corresponding balanced location, at which the valve closing spring force of the return spring 14, the feedback valve closing force generated by the pressure in the feedback chamber 27 and a valve opening drive force of the electromagnetic actuator 15 are balanced.

(Description of Electromagnetic Actuator 15)

An example of the electromagnetic actuator 15 will be described with reference to FIG. 1.

The electromagnetic actuator 15 includes a coil 31, a plunger 32, a stator 33, a yoke 34 and a connector (not shown).

Upon energization, the coil 31 generates a magnetic force to form a magnetic flux loop, which passes the plunger 32 and a magnetic stator (the stator 33, the yoke 34). A conductive wire (e.g., an enameled wire), which has a dielectric coating, is wound many times around a resin bobbin 31a.

The plunger 32 is a magnetic metal (e.g., a ferromagnetic material, such as iron) that is shaped into a generally cylindrical body. The plunger 32 directly slidably contacts an inner peripheral surface of the stator 33 (more specifically, an inner peripheral surface of the slidable stator 38).

The plunger 32 is engaged with the spool 12 through a shaft 35, which is axially slidably supported along the axis of the stator 33 (more specifically, an axis of an attractive stator 36 described below). The plunger 32 is urged in the right direction (the valve closing direction) in FIG. 1 along with the spool 12 by the valve closing spring force, which is applied to the spool 12.

A breathing hole 32a axially extends through the plunger 32.

The stator 33 is made of a magnetic metal (e.g., a ferromagnetic material, such as iron) to conduct a magnetic flux, which passes an interior side of the coil 31. The stator 33 includes the attractive stator 36, a magnetoresistive portion 37 and the slidable stator 38, which are arranged in this order from the left side to the right side in FIG. 1. The attractive stator 36, the magnetoresistive portion 37 and the slidable stator 38 are integrally formed.

The attractive stator 36 includes a flange portion and an attractive portion. The flange portion is magnetically coupled with an opening end of the yoke 34, and the attractive portion is axially opposed to the plunger 32. A magnetically attractive portion (a main magnetic gap) is formed between the attractive portion and the plunger 32.

An attractive recess portion, into which an end of the plunger 32 is receivable, is formed in a portion of the attractive stator 36. The attractive stator 36 and a portion of the plunger 32 axially overlap with each other. A tapered surface is formed in an outer peripheral surface of the attractive recess portion to limit a change in a magnetic attractive force in response to an amount of stroke of the plunger 32. A breathing hole 36a axially extends through the attractive stator 36.

The magnetoresistive portion 37 is a groove, which limits direct flow of a magnetic flux between the attractive stator 36 and the slidable stator 38. The groove is formed between the attractive stator 36 and the slidable stator 38 to circumferentially extend all around the attractive stator 36 and the slidable stator 38.

The slidable stator 38 is a tubular body, which surrounds the plunger 32. Furthermore, the slidable stator 38 is magnetically coupled with a bottom of the yoke 34. The slidable stator 38 directly slidably engages the plunger 32 to axially slidably support the plunger 32. Also, the slidable stator 38 conducts a radial magnetic flux relative to the plunger 32.

The yoke 34 is formed as a generally cup shaped body, which covers the coil 31 and is made of a magnetic material (e.g., a ferromagnetic material, such as iron) to conduct the magnetic flux. The yoke 34 is securely connected to the valve housing 11 by radially inwardly bending claws formed at the opening end of the yoke 34 against the valve housing 11.

The connector (not shown) is a connecting means for electrically connecting with an electronic control unit (not shown), which controls the engagement and disengagement of the friction engaging device by controlling the output hydraulic pressure of the output port 18, through a connection line.

The electronic control unit controls a power supply quantity (an electric current value) to the coil 31 of the electromagnetic actuator 15 by controlling a duty ratio. More specifically, the electronic control unit generates a valve opening drive force in the plunger 32 against the valve closing spring force of the return spring 14 and the feedback valve closing force of the feedback chamber 27 by controlling the power supply quantity to the coil 31 to linearly change the axial position of the spool 12 and thereby to control the output hydraulic pressure of the output port 18.

(Operation of Electromagnetic Hydraulic Pressure Control Valve 10)

When the drive electric current, which is supplied to the electromagnetic actuator 15, is gradually increased from a deenergized state of the electromagnetic actuator 15 to gradually increasing the valve opening drive force of the electromagnetic actuator 15, the spool 12 begins its stroke in the valve opening direction from its deenergized position (a valve closing position). When the amount of stroke of the spool 12 increases, an axial input seal length of the input seal land 23 for closing the input port 17 decreases, and, at the same time, an axial effluent seal length of the effluent seal land 24 for closing the effluent port 19 increases.

When the position of the spool 12 is shifted from the valve closing position to a valve opening position upon the movement of the spool 12 in the valve opening direction, oil is supplied from the input port 17 to the output chamber 25.

When the position of the spool 12 reaches an output start position, an oil quantity, which is supplied from the input port 17 to the output chamber 25, is balanced with an oil quantity, which outflows from the output chamber 25 to the effluent port 19.

When the position of the spool 12 is shifted further from the output start position in the valve opening direction, the oil quantity, which is supplied from the input port 17 to the output chamber 25, exceeds the oil quantity, which outflows from the output chamber 25 to the effluent port 19, so that the hydraulic pressure is outputted from the output port 18.

When the position of the spool 12 is shifted further in the valve opening direction, the hydraulic pressure output from the output port 18 increases in response to an increase in the amount of stroke of the spool 12.

Figure 2A:
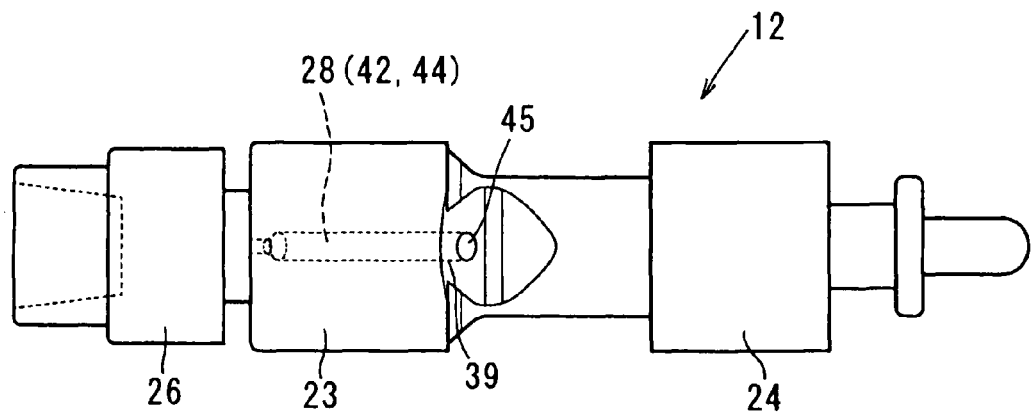
FIG. 2A is a side view of a spool according to the first embodiment.

With reference to FIG. 2A, notches 39 are formed in the input seal land 23. When the spool 12 reaches the valve opening position, the notches 39 provide small openings (small communication paths) to the input port 17 to allow communication between the input port 17 and the output chamber 25 and thereby to limit the hunting of the spool 12.

Each notch 39 is formed as a recess located at an output chamber 25 side end of the input seal land 23. Furthermore, the multiple (two in the present embodiment) notches 39 are axisymmetrically arranged to avoid application of a biased force to the spool 12 from the oil that passes the notches 39.

Characteristics of First Embodiment

The electromagnetic hydraulic pressure control valve 10 of the first embodiment has the following technical features.

(a) The spool valve 13 includes the valve housing 11 and the spool 12. The valve housing 11 includes the input port 17 and the output port 18. The input port 17 receives the supply of oil, and the output port 18 is communicated with the hydraulic servo 5 (the control subject chamber). The spool 12 includes the input seal land 23, which is slidably supported in the valve housing 11 to open and close the input port 17 upon the corresponding slide movement of the spool 12. When the input port 17 is opened through the slide movement of the input seal land 23, the oil is supplied from the input port 17 into the output chamber 25.

(b) the spool valve 13 includes the feedback chamber 27, which applies the force to the spool 12 in the valve closing direction upon the pressure increase in the feedback chamber 27.

(c) The electromagnetic actuator 15 corresponds to the valve opening direction drive means for applying the valve opening drive force (the force in the valve opening direction) to the spool 12 in the case where the electromagnetic hydraulic pressure control valve 10 is of the N/L type.

(d) The return spring 14 corresponds to the valve closing direction drive means for applying the valve closing drive force (the force in the valve closing direction) to the spool 12 in the case where the electromagnetic hydraulic pressure control valve 10 is of the N/L type.

(e) The electromagnetic hydraulic pressure control valve 10 includes a negative pressure generating means 41, which generates the negative pressure in response to the flow velocity in the oil passage from the input port 17 to the hydraulic servo 5.

(f) The electromagnetic hydraulic pressure control valve 10 includes a negative pressure guide passage 42 that guides the negative pressure, which is generated at the negative pressure generating means 41, to the feedback chamber 27.

The above described technical features (e) and (f) will be described further below.

(Description of Negative Pressure Generating Means 41)

The negative pressure generating means 41 will be described further.

In the first embodiment and the following second embodiment, the negative pressure generating means 41 is provided inside the spool valve 13. Furthermore, in the following third and fourth embodiments, the negative pressure generating means 41 is provided outside the spool valve 13.

In the first to third embodiments, the negative pressure generating means 41 includes a constriction, i.e., a throttled portion (a venturi portion) 43 and a negative pressure port 44 in the fluid passage (the input port 17, the output chamber 25, the output port 18 and the output passage 6), which extends from the input port 17 to the hydraulic servo 5. The constriction 43 is constricted to have a reduced flow passage cross sectional area in the fluid passage. The negative pressure port 44 opens in a direction that is perpendicular to a flow direction of the oil, i.e., the fluid at a location, at which the flow velocity of the oil is increased by the constriction 43.

(Description of Constriction 43)

In the first and second embodiments, the constriction 43 is formed by the small communication opening between the input port 17 and the corresponding notch 39.

When the input port 17 is opened to shift from the valve closing state to the valve opening state and thereby to increase the hydraulic pressure of the hydraulic servo 5, an oil flow quantity, which is supplied from the input port 17 to the hydraulic servo 5, temporarily becomes large due to an increase in the supplied hydraulic pressure.

At this time, the large flow quantity is also applied to the constriction 43 between the input port 17 and the notch 39. Thus, a high velocity fluid flow (oil flow) is generated at the location between the input port 17 and the notch 39 and also at a location immediately after (immediately below) the notch 39.

(Description of Negative Pressure Port 44)

In the first and second embodiments, the negative pressure port 44 is formed by using the feedback port 28. In this way, the opening of the feedback port 28 in the output chamber 25 also serves as the opening of the negative pressure port 44, which will be referred to as a feedback inlet 45.

It is desirable to provide the feedback inlet 45 at a location immediately after (immediately below) the notch 39 on the downstream side of the notch 39, through which the high velocity oil flow that has passed the notch 39 flows right after the valve opening, in order to generate the relatively large negative pressure in the feedback port 28 and the feedback chamber 27.

Figure 2B:
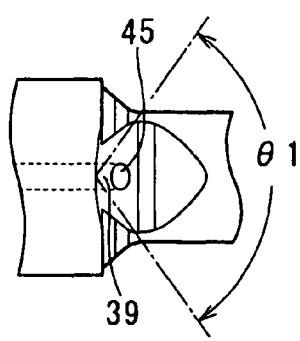
FIG. 2B is a partial descriptive view showing a part of the spool of FIG. 2A for describing a design parameter.

More specifically, it is desirable to place the opening of the feedback inlet 45 at a location that is at or around a center of a downstream side range $\theta 1$, which is located on the downstream side of the notch 39, as shown in FIG. 2B. Thus, as will be understood from the foregoing and from FIG. 2B, a plane bisecting the locally defined constriction, provided in this embodiment by notch 39, and parallel to a longitudinal axis of the spool intersects the negative pressure port.

Figure 2C:
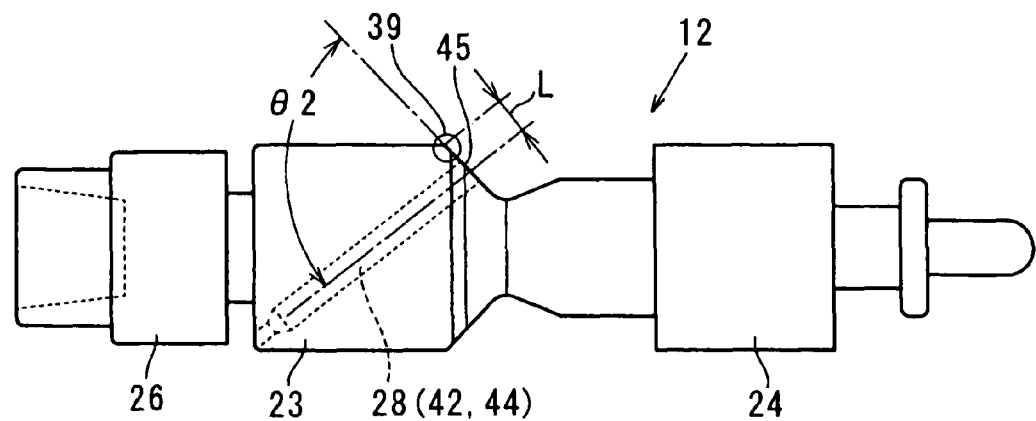
FIG. 2C is a descriptive view of the spool of FIG. 2A for describing design parameters.

Furthermore, it is desirable that the opening of the feedback inlet 45 is placed such that a distance L between an apex (a portion that first opens the input port 17) of the notch 39 and the feedback inlet 45 (a central axis of the feedback inlet 45) is minimized, as shown in FIG. 2C.

Furthermore, as shown in FIG. 2C, an angle $\theta 2$ between a slant surface of the notch 39 (a notched surface of the notch 39 that is slanted relative to an axial line parallel to the axis of the spool 12) and the feedback port 28 (the central axis of the feedback port 28) is in a range of 120 degrees to 30 degrees, within which the negative pressure is generated in the feedback port 28 by the flow velocity on the downstream side of the notch 39, and is more preferably in a range of about 90 degrees, within which the negative pressure is effectively generated in the feedback port 28.

(Description of Generation of Negative Pressure)

Figure 3:
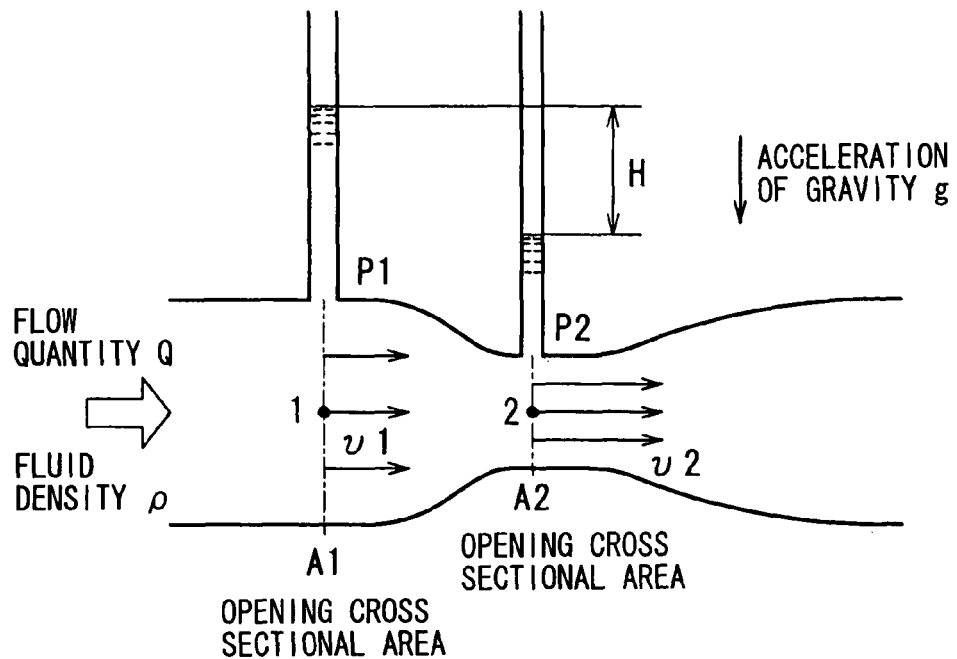
FIG. 3 is a schematic descriptive view showing a mechanism of generating a negative pressure according to the first embodiment.

Generation of the negative pressure $\Delta p$ in the negative pressure port 44 will be described with reference to FIG. 3.

When the constriction 43 is provided in the flow passage, the flow velocity at the constriction 43 is increased. When the negative pressure port 44, which opens in the direction generally perpendicular to the flow direction, is provided at the portion of the constriction 43, at which the flow velocity is relatively high, the negative pressure $\Delta p$, which is obtained through the following equation (1), is generated at the negative pressure port 44.

$$\Delta p = (1/2) \cdot \rho \cdot (v2^2 - v1^2) \qquad \text{Equation 1}$$

$\rho$: a fluid density
$A_1$: a passage cross sectional area on an upstream side of the constriction 43
$A_2$: a passage cross sectional area of the constriction 43
v1: a f flow velocity on the upstream side of the constriction 43
v2: a f flow velocity at the constriction 43
Q: a flow quantity
The flow velocity v1: $Q/A_1$
The flow velocity v2: $Q/A_2$ As in the present embodiment, when the passage cross sectional area $A_1$ of the input port 17 is significantly larger than the passage cross sectional area $A_2$ of the constriction 43, i.e., when $v1^2$ is negligibly smaller than $v2^2$, the negative pressure $\Delta p$ can be obtained through the following equation (2).

$$\Delta p = (1/2) \cdot \rho \cdot v2^2 \qquad \text{Equation 2}$$

(Description of Negative Pressure Guide Passage 42)

Next, the negative pressure guide passage 42 will be described.

In the first and second embodiments, the negative pressure guide passage 42 is provided in the spool 12 (more specifically, in the input seal land 23). In contrast, in the third and fourth embodiments, the negative pressure guide passage 42 is provided in a member located outside of the spool 12.

Specifically, in the first and second embodiments, the negative pressure guide passage 42 is formed by using the feedback port 28. That is, the feedback port 28 functions as a passage, which guides the pressure of the output chamber 25 to the feedback chamber 27. The feedback port 28 also functions as the negative pressure port 44. Furthermore, the feedback port 28 functions as the negative pressure guide passage 42 that guides the negative pressure, which is generated in the negative pressure port 44, to the feedback chamber 27.

First Advantage of First Embodiment

As described above, the electromagnetic hydraulic pressure control valve 10 of the first embodiment includes the constriction (negative pressure generating portion) 43, which is formed by the notch 39 and the input port 17 and which serves as the negative pressure generating means 41 that generates the negative pressure by the oil flow from the input port 17 to the hydraulic servo 5. The electromagnetic hydraulic pressure control valve 10 also includes the negative pressure port 44, which generates the negative pressure by the flow velocity on the downstream side of the constriction 43. The feedback port 28 serves as the negative pressure port 44 and the negative pressure guide passage 42.

Therefore, right after the valve opening of the input port 17, when the high velocity oil flow is generated at the location immediately after (immediately below) the constriction 43, which is formed by the notch 39 and the input port 17, the negative pressure, which is generated in the negative pressure port 44, is conducted to the feedback chamber 27 through the feedback port 28 to act in the feedback chamber 27.

The feedback chamber 27 provides the force in the valve closing direction to the spool 12 upon the increase in the hydraulic pressure. When the negative pressure, which is opposite from the positive pressure increase, is provided to the feedback chamber 27, a negative pressure valve opening force is exerted in the spool 12.

The feedback chamber 27 receives the output hydraulic pressure of the pressure chamber 25 through the feedback port 28. Therefore, right after the valve opening of the input port 17, a sum of the output hydraulic pressure and the negative pressure is applied to the feedback chamber 27. However, it should be noted that the supplied hydraulic pressure of the hydraulic servo 5 is relatively small right after the valve opening of the input port 17, so that the output hydraulic pressure is also relatively small.

In this way, the fluid reaction force (the valve closing force), which is applied to the spool 12 right after the valve opening of the input port 17, is cancelled by the negative valve opening force. Thus, it is possible to limit the deterioration of the output response, which would be otherwise caused by the fluid reaction force (the valve closing force) that urges the spool 12 in the valve closing direction right after the valve opening.

Furthermore, the fluid reaction force, which is applied to the spool 12 right after the valve opening of the input port 17, is cancelled by the negative pressure valve opening force, so that the valve opening drive force of the electromagnetic actuator 15 right after the valve opening of the input port 17 can be reduced. Therefore, it is not required to increase the size of the electromagnetic actuator 15, and also it is possible to reduce the electric power consumption of the electromagnetic actuator 15 right after the valve opening.

Now, the above advantages will be described more specifically.

First, with reference to FIGS. 8A to 9C, the fluid reaction force will be described in connection with the electromagnetic hydraulic pressure control valve 10, in which the present invention is not implemented.

When the input seal land 23 is moved from the valve closing state to communicate between the input port 17 and the output chamber 25, the notch 39 opens first to communicate between the input port 17 and the output chamber 25. Thereby, as indicated by the arrow a in FIG. 9A, the high velocity oil flow passes through the notch 39 (the small gap between the input seal land 23 and the valve housing 11).

Figure 9A:
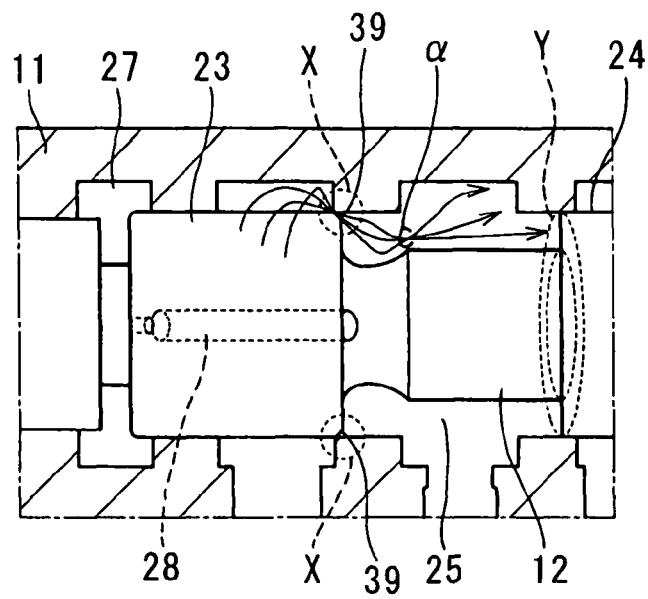
FIG. 9A is a schematic longitudinal cross sectional view showing the prior art electromagnetic hydraulic pressure control valve.

The flow direction, which is indicated by the arrow a in FIG. 9A, is the axial valve closing direction, so that the high velocity oil flow, which passes through the notch 39, provides the fluid reaction force (see the arrow p in FIG. 8A or 8B) that acts as the valve closing force on the spool 12.

Furthermore, the high velocity oil flow, which is supplied into the output chamber 25 through the notch 39, impinges against the effluent seal land 24 to provide the fluid reaction force (see the arrow β in FIG. 8A or 8B) that acts as the valve closing force on the spool 12.

Figure 4A:
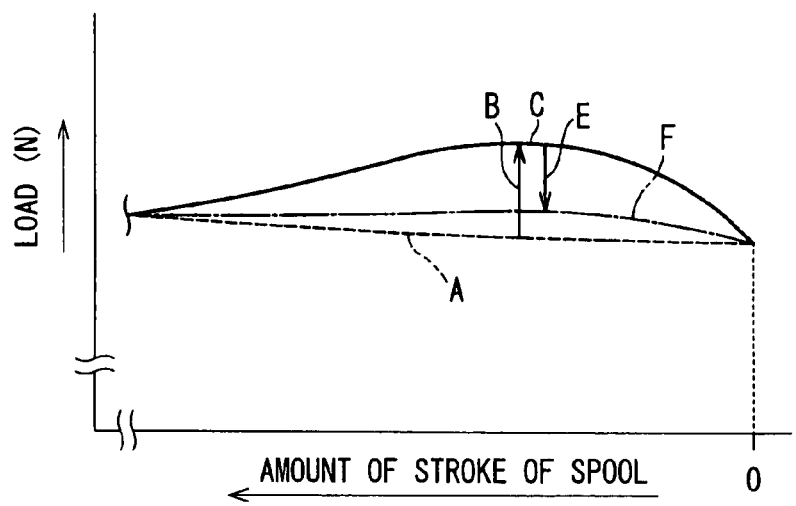
FIG. 4A is a diagram showing a relationship between a load and an amount of stroke of the spool according to the first embodiment.
Figure 4B:
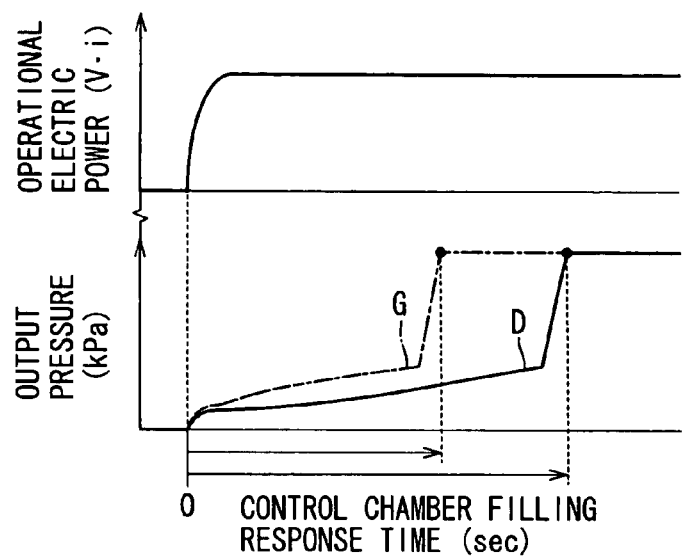
FIG. 4B is a diagram showing a relationship between an operational electric power and a control chamber filling response time as well as a relationship between an output pressure and the response time, illustrating an advantage of the first embodiment.
Figure 4C:
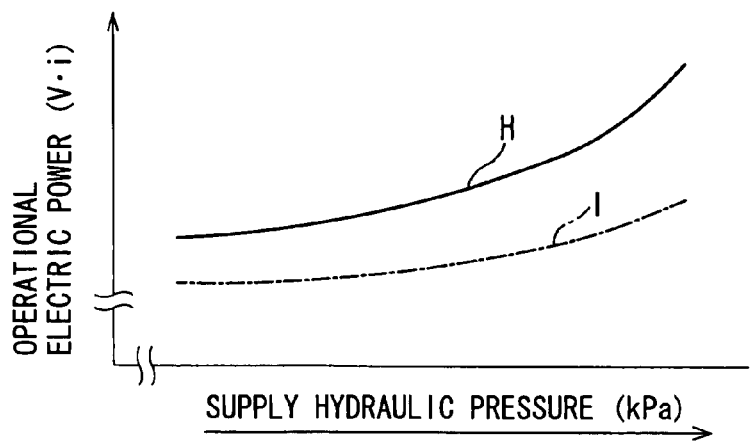
FIG. 4C is a diagram showing a relationship between the operational electric power and a supply hydraulic pressure, illustrating an advantage of the first embodiment.

Therefore, right after the valve opening, the spool 12 is pushed back in the valve closing direction by a resultant force (see numeral C in FIG. 4A), which is a sum of the valve closing spring force (see numeral A in FIG. 4A) and the fluid reaction force (see an arrow B in FIG. 4A).

Figure 9B:
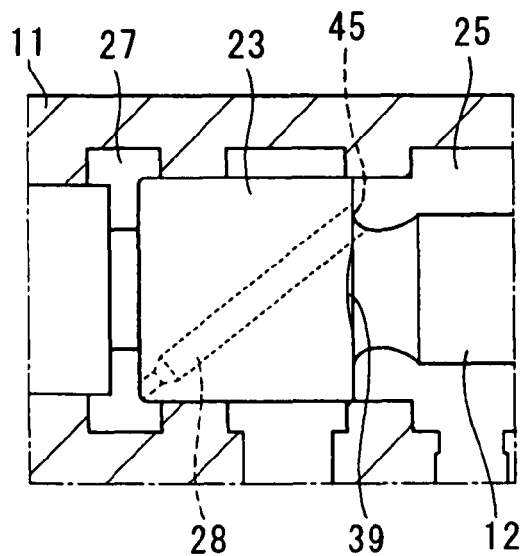
FIG. 9B is a schematic longitudinal cross sectional view, showing a feedback inlet of the prior art electromagnetic hydraulic pressure control valve.
Figure 9C:
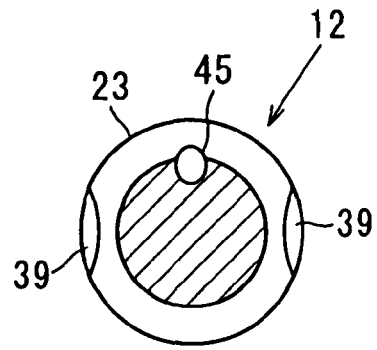
FIG. 9C is a transverse cross sectional view of the prior art electromagnetic hydraulic pressure control valve, showing the feedback inlet.

FIGS. 9B and 9C show the feedback inlet 45 of the electromagnetic hydraulic pressure control valve 10, in which the present invention is not implemented. The feedback inlet 45 of the electromagnetic hydraulic pressure control valve 10, in which the present invention is not implemented, is opened at the location, which is apart from the notch 39 (specifically, at the location displaced from the notch 39 by 90 degrees in the circumferential direction). Thus, even when the high velocity oil flow is generated at the notch 39, the negative pressure is not generated in the feedback port 28. Thereby, the spool 12 is pushed back, and the sufficient flow quantity for quickly filling the hydraulic servo 5 cannot be obtained. As a result, as indicated by a solid line D in FIG. 4B, the response time is delayed, and the undesirable output response is made.

Furthermore, in order to obtain the good output response in the electromagnetic hydraulic pressure control valve 10, in which the present invention is not implemented, the electromagnetic actuator 15 needs to have the valve opening drive force, which can overcome the valve closing spring force and the relatively large fluid reaction force (the valve closing force) generated right after the valve opening. Therefore, as indicated by a solid line H in FIG. 4C, at the maximum value of the fluid reaction force, the operational electric power of the electromagnetic actuator 15 becomes relatively large.

In contrast to this, in the case of the electromagnetic hydraulic pressure control valve 10 of the first embodiment of the present invention, the negative pressure is generated in the feedback port 28 by the high velocity oil flow at the location immediately after (immediately below) the notch 39, and this negative pressure is guided into the feedback chamber 27 to generate the negative pressure valve opening force (see an arrow E in FIG. 4A) at the spool 12. In this way, the fluid reaction force (the valve closing force) is cancelled by the negative pressure valve opening force. As a result, as indicated by a dot-dash line F in FIG. 4A, the fluid reaction force, which acts on the spool 12, seems to be reduced. Therefore, as indicated by a dot-dash line G in FIG. 4B, the response time is shortened, and thereby the good output response can be achieved.

As discussed above, according to the first embodiment, the fluid reaction force can be reduced by the negative pressure valve opening force. Thus, the valve opening drive force for obtaining the predetermined output response right after the valve opening can be reduced. As a result, as indicated by a dot-dash line I in FIG. 4C, at the maximum value of the fluid reaction force, the operational electric power of the electromagnetic actuator 15 can be reduced, and thereby the power saving of the electromagnetic actuator 15 can be achieved.

In general, in recent years, the supply hydraulic pressure, which is supplied to the input port 17, tends to be increased to cause the increase in the fluid reaction force. This leads to the increase in the size of the electromagnetic actuator 15 and the increase in the electric power consumption of the electromagnetic actuator 15.

However, in the case of the electromagnetic hydraulic pressure control valve 10 of the first embodiment, the fluid reaction force is limited by the negative pressure valve opening force, as described above. Thus, even when the supply hydraulic pressure is increased, the required valve opening drive force of the electromagnetic actuator 15 can be limited to avoid the increase in the size of the electromagnetic actuator 15 and the deterioration in the electric power consumption of the electromagnetic actuator 15.

Second Advantage of First Embodiment

In the first embodiment, the constriction 43, which reduces the flow passage cross sectional area, is used to generate the negative pressure. Thus, the negative pressure can be efficiently generated by the oil flow at the constriction 43, and the negative pressure valve opening force can be efficiently obtained.

Furthermore, according to the first embodiment, the constriction 43 is made by the small opening between the input port 17 and the notch 39. Thus, an additional separate component, which serves as the constriction 43, is not required, so that an increase in the costs can be limited.

Furthermore, when the feedback port 28 and the negative pressure guide passage 42 are provided separately, a portion of the negative pressure, which is guided from the negative pressure guide passage 42 into the feedback chamber 27, is released through the feedback port 28. However, according to the first embodiment, the feedback port 28, which is provided in the spool 12, also functions as the negative pressure guide passage 42. Thus, the negative pressure, which is guided from the negative pressure guide passage 42 into the feedback chamber 27, will not be released through the feedback port 28. Therefore, the negative pressure valve opening force can be efficiently generated by the negative pressure, which is guided into the feedback chamber 27.

Second Embodiment

Figure 5:
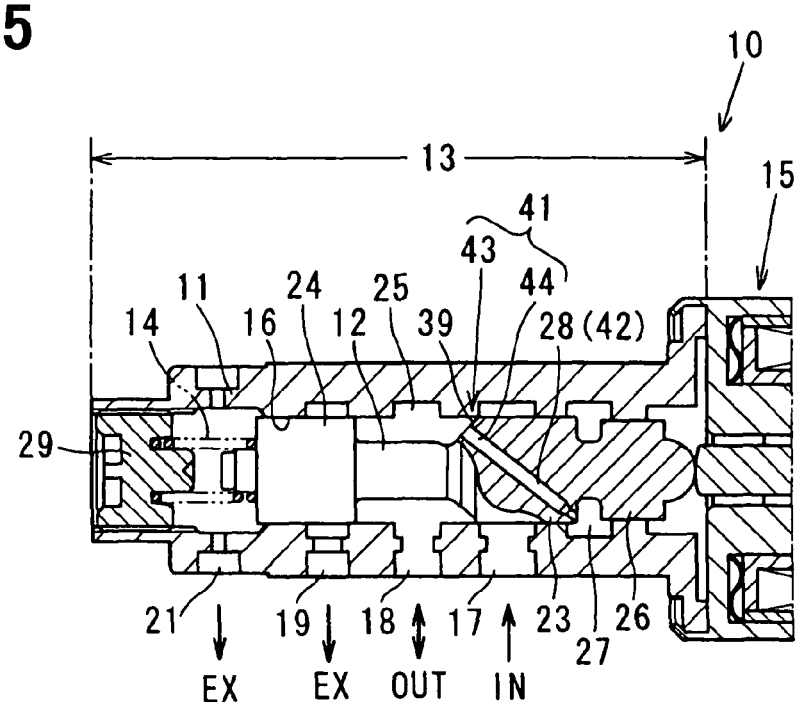
FIG. 5 is a schematic cross sectional view showing an electromagnetic hydraulic pressure control valve according to a second embodiment of the present invention.

The second embodiment of the present invention will be described with reference to FIG. 5. In the following embodiments, functional components, which are similar to those of the first embodiment, are indicated by the same numerals.

In the first embodiment, the present invention is implemented in the electromagnetic hydraulic pressure control valve 10 of the N/L type.

In contrast, according to the second embodiment, the present invention is implemented in the electromagnetic hydraulic pressure control valve 10 of the N/H type. In the electromagnetic hydraulic pressure control valve 10 of the N/H type, the electromagnetic actuator 15 serves as the valve closing direction drive means for applying the valve closing drive force (the force in the valve closing direction) to the spool 12. The return spring 14 serves as the valve opening direction drive means for applying the valve opening spring force (the force in the valve opening direction) to the spool 12.

Similar to the first embodiment, even in the electromagnetic hydraulic pressure control valve 10 of the N/H type, the high velocity oil flow into the output chamber 25 is generated at the small opening between the notch 39 and the input port 17 immediately after the valve opening of the input port 17. Thus, the fluid reaction force is generated at the spool 12.

Therefore, since the fluid reaction force is applied to the spool 12 even in the electromagnetic hydraulic pressure control valve 10 of the N/H type, the output response is deteriorated.

Furthermore, when the valve opening spring force of the return spring 14 is increased to overcome the fluid reaction force and thereby to reduce the deterioration of the output response, the valve closing drive force, which overcomes the valve opening spring force, needs to be generated at the electromagnetic actuator 15. Therefore, the size of the electromagnetic actuator 15 is disadvantageously increased, and the operational electric power of the electromagnetic actuator 15 is disadvantageously increased.

In view of the above points, according to the second embodiment, similar to the first embodiment, the electromagnetic hydraulic pressure control valve 10 of the N/H type includes the feedback inlet 45 immediately after (immediately below) the notch 39 to guide the negative pressure, which is generated by the high velocity oil flow at the location immediately after (immediately below) the constriction 43 formed by the notch 39 and the input port 17, into the feedback chamber 27 through the feedback port 28.

In this way, similar to the first embodiment, the feedback chamber 27 provides the force in the valve closing direction to the spool 12 through the increase in the hydraulic pressure. When the negative pressure, which is opposite from the positive pressure increase, is provided to the feedback chamber 27, the negative pressure valve opening force is exerted in the spool 12.

In this way, the fluid reaction force (the valve closing force), which is applied to the spool 12 right after the valve opening of the input port 17, is cancelled by the negative valve opening force. Thus, it is possible to limit the deterioration of the output response, which would be otherwise caused by the fluid reaction force (the valve closing force) that urges the spool 12 in the valve closing direction right after the valve opening.

Furthermore, since the fluid reaction force, which acts on the spool 12 right after the valve opening of the input port 17, can be cancelled by the negative pressure valve opening force, it is not required to increase the valve opening spring force, and thereby it is possible to reduce the valve closing drive force. Therefore, the size of the electromagnetic actuator 15 can be reduced, and the power saving of the electromagnetic actuator 15 can be achieved.

Third Embodiment

Figure 6:
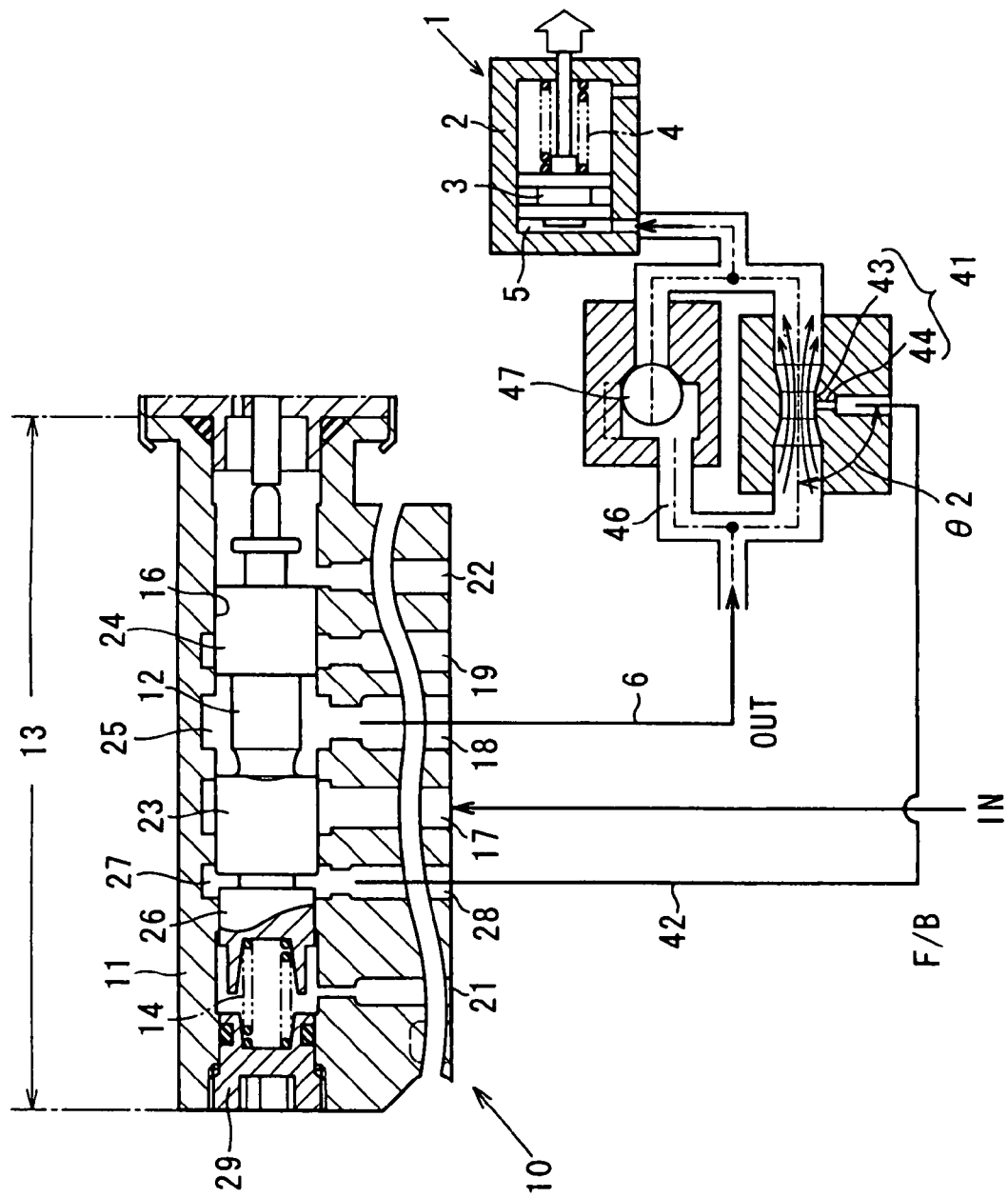
FIG. 6 is a schematic diagram showing a hydraulic pressure control apparatus according to a third embodiment of the present invention.

The third embodiment of the present invention will be described with reference to FIG. 6.

In the first and second embodiments, the negative pressure generating means 41 and the negative pressure guide passage 42 are provided in the spool valve 13.

In contrast, according to the third embodiment, the negative pressure generating means 41 and the negative pressure guide passage 42 are provided outside the spool valve 13.

The construction 43 of the third embodiment is provided in the output passage 6, which communicates between the output port 18 and the hydraulic servo 5. Furthermore, the negative pressure guide passage 42 is an external passage, which communicates between the constriction 43 and the feedback chamber 27 and is formed outside the spool 12.

Specifically, the constriction 43 of the third embodiment is provided in the output passage 6 to reduce the passage cross sectional area of the output passage 6. A small diameter negative pressure port 44 is provided in the constriction 43 to extend in the direction generally perpendicular to the flow direction of the oil at the constriction 43. The angle $\theta 2$ between the inner peripheral surface of the constriction 43 and the negative pressure port 44 (the central axis of the negative pressure port 44) is in the range of 120 degrees to 30 degrees, within which the negative pressure is generated in the negative pressure port 44 by the flow velocity at the constriction 43, and is more preferably in a range of about 90 degrees, within which the negative pressure is effectively generated in the negative pressure port 44.

The negative pressure guide passage 42 communicates between the feedback chamber 27 and the negative pressure port 44 and includes the feedback port 28, which is formed in the valve housing 11 and communicates with the feedback chamber 27, and the external passage, which is formed in the housing that forms the hydraulic circuit and which communicates between the feedback port 28 and the negative pressure port 44. The negative pressure guide passage 42 also functions as the feedback port 28, which guides the output hydraulic pressure to the feedback chamber 27.

Even when the constriction 43 is provided outside the spool valve 13 like in the third embodiment, the negative pressure can be generated in the negative pressure port 44 by the high velocity oil flow generated at the constriction 43 right after the valve opening of the hydraulic pressure port, and the thus generated negative pressure can be guided into the feedback chamber 27 to supply the negative pressure valve opening force to the spool 12. Therefore, advantages similar to those of the first embodiment can be achieved.

Furthermore, according to the third embodiment, the constriction 43 is provided in the output passage 6, which communicates between the output port 18 and the hydraulic servo 5. Therefore, there are fewer design limitations on the constriction 43 and the negative pressure port 44. Thus, the configuration of the constriction 43 and the position of the negative pressure port 44 can be more freely chosen to permit the generation of the appropriate negative pressure in the negative pressure port 44. In this way, the appropriate negative pressure valve opening force, which is suitable for canceling the fluid reaction force (the valve closing force), can be generated at the spool 12.

Here, according to the third embodiment, a parallel flow passage 46, which conducts the oil, is provided in parallel with the constriction 43. Furthermore, a check valve 47 is provided in the parallel flow passage 46 to conduct the oil in one way only from the hydraulic servo 5 side to the output port 18 side.

Through the provision of the check valve 47, a flow resistance of the oil is reduced at the time of outputting the filled hydraulic pressure from the hydraulic servo 5 by opening the effluent port 19. Thus, the hydraulic pressure reducing performance at the time of reducing the hydraulic pressure from the hydraulic servo 5 is improved. The check valve 47 and the parallel flow passage 46 may be eliminated, if desired.

Furthermore, in the third embodiment, although the electromagnetic hydraulic pressure control valve 10 of the N/L type is described, the electromagnetic hydraulic pressure control valve 10 of the N/H type may be alternatively used like in the second embodiment.

Fourth Embodiment

Figure 7:
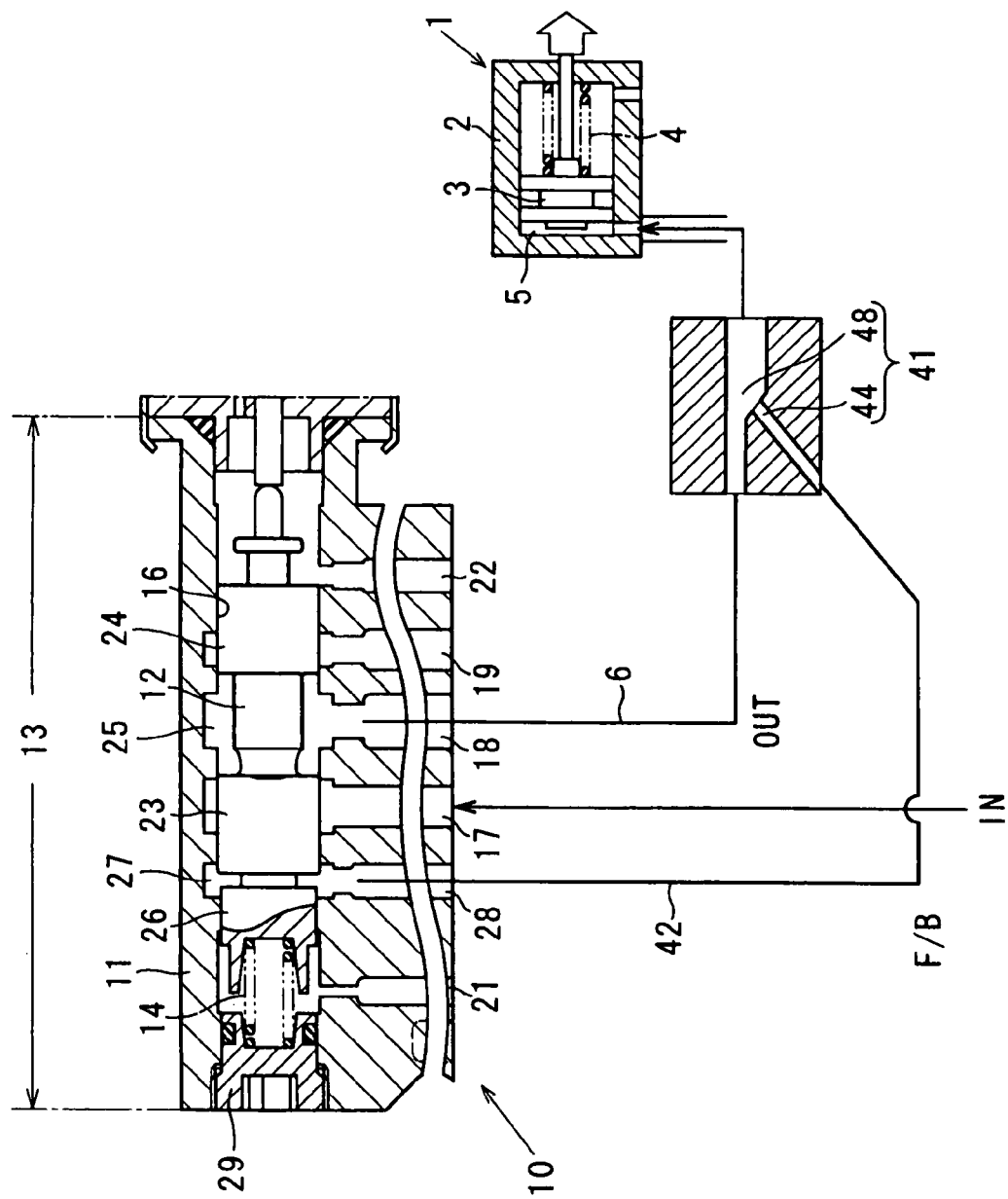
FIG. 7 is a schematic diagram showing a hydraulic pressure control apparatus according to a fourth embodiment of the present invention.
Figure 8A:
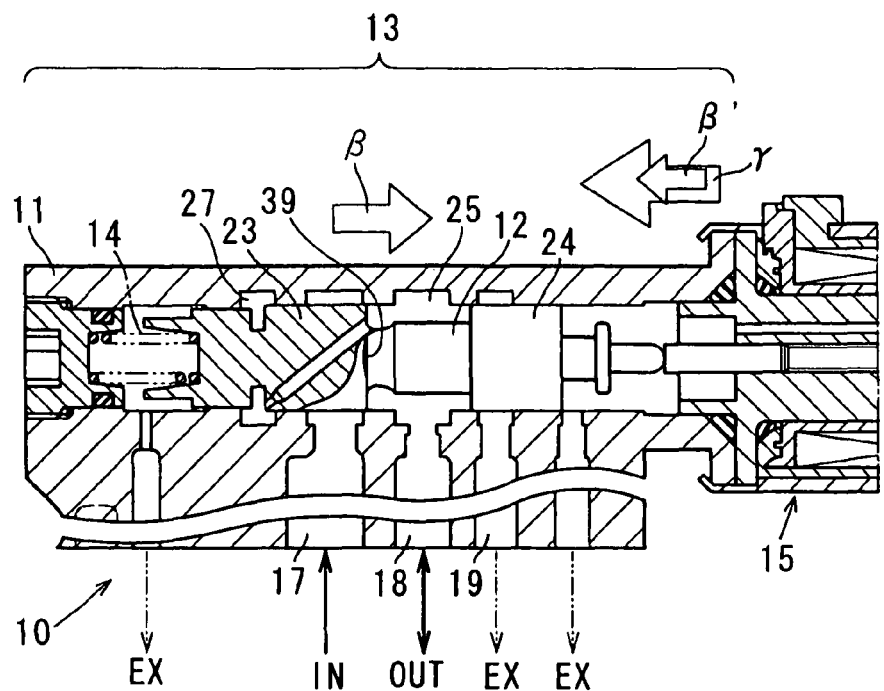
FIG. 8A is a schematic cross sectional view showing a prior art electromagnetic hydraulic pressure control valve of an N/L type.
Figure 8B:
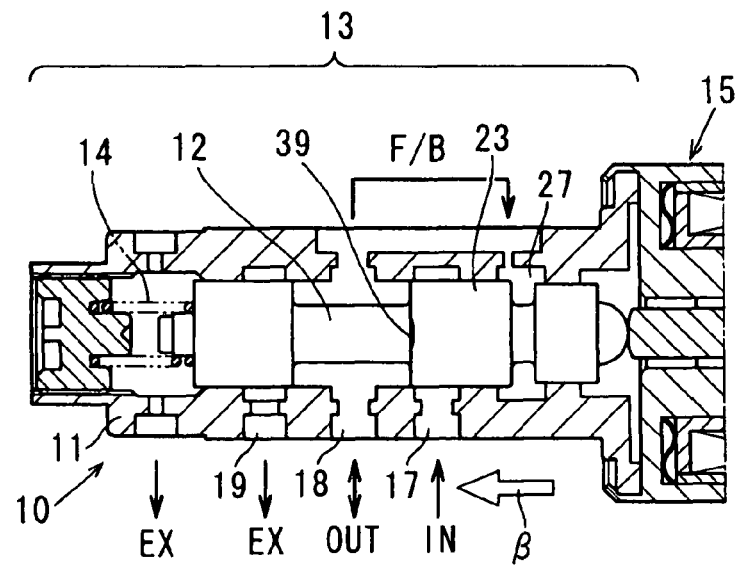
FIG. 8B is a schematic cross sectional view showing a prior art electromagnetic hydraulic pressure control valve of an N/H type.

The fourth embodiment of the present invention will be described with reference to FIG. 7.

In the first to third embodiments, the negative pressure generating means 41 uses the constriction 43.

In contrast, the negative pressure generating means 41 of the fourth embodiment does not use the constriction 43.

The negative pressure generating means 41 of the fourth embodiment includes an enlarged portion (or a bent portion) 48, at which the flow passage cross sectional area is increased, in the output passage 6 that extends from the output port 18 to the hydraulic servo 5. Furthermore, the negative pressure port 44 opens in the direction perpendicular to a flow passage surface of the enlarged portion (negative pressure generating portion) 48, at which the negative pressure is generated due to a separation phenomenon o the fluid. Similar to the third embodiment, the negative pressure guide passage 42 is the external passage, which is provided outside the spool 12 and communicates between the negative pressure port 44 and the feedback chamber 27.

As in the fourth embodiment, even when the constriction 43 is not provided, the negative pressure can be guided into the feedback chamber 27. Thus, at the time of valve opening, the negative pressure valve opening force can be supplied to the spool 12, and thereby advantages similar to those of the first embodiment can be achieved.

Furthermore, in the fourth embodiment, the constriction 43 is not provided in the output passage 6. Thus, a flow passage resistance of the output passage 6 can be reduced in the case of two-way flows (i.e., both the flow from the output port 18 to the hydraulic servo 5 and the flow from the hydraulic servo 5 to the output port 18). In this way, the hydraulic pressure increasing performance at the time of increasing the hydraulic pressure of the hydraulic servo 5 is improved, and also the hydraulic pressure decreasing performance at the time of decreasing the hydraulic pressure of the hydraulic servo 5 is improved.

Furthermore, in the fourth embodiment, although the electromagnetic hydraulic pressure control valve 10 of the N/L type is described, the electromagnetic hydraulic pressure control valve 10 of the N/H type may be alternatively used.

Fifth Embodiment

The fifth embodiment will be described without referring to drawing(s).

The negative pressure generating means 41 of the first to fourth embodiments uses the negative pressure port 44 as the means for generating the negative pressure through use of the flow velocity.

In contrast, according to the fifth embodiment, a negative pressure, which is generated due to the configuration of the output passage 6 and the oil flow, is used. For example, a passage recess or a flow passage bent of the output passage 6 is used to generate the negative pressure, which is then supplied to the feedback chamber 27 through the negative pressure guide passage 42 (the feedback port 28). The passage recess or the flow passage bent may be ones, which preexist in the output passage 6, or may be ones, which are newly provided in the output passage 6.

(Modifications)

In the above embodiments, the feedback port 28 and the negative pressure guide passage 42 are formed commonly. Alternatively, the feedback port 28 and the negative pressure guide passage 42 may be provided separately. Specifically, the present invention may be implemented in the preexisting electromagnetic hydraulic pressure control valve 10, which includes the feedback port 28. In a case where the feedback port 28 is provided separately from the negative pressure guide passage 42, it is desirable to provide, for example, an orifice at the feedback port 28 to limit release of the negative pressure, which is supplied to the feedback chamber 27 through the negative pressure guide passage 42.

In the above embodiment, the hydraulic servo 5 of the automatic transmission is used as the example of the control subject chamber. Alternatively, the control subject chamber may be any other control subject chamber, such as a hydraulic actuation chamber of a hydraulic valve, which changes its volume through use of a hydraulic pressure.

As in the third to fifth embodiments, in the case where the negative pressure generating means 41 is provided in the output passage 6, the notch(es) 39 may be provided in the valve housing 11.

In the above embodiment, the control operation is performed on the oil pressure, which is used as the example of the hydraulic pressure. Alternatively, any other hydraulic pressure, i.e., any other liquid pressure or any other gas pressure may be controlled.

In the above embodiments, the three way valve structure is shown as the example of the spool valve 13. Alternatively, any other spool valve, which has any other valve structure, such as a two-way valve (opening and closing valve) structure or a four-way valve structure, may be used.

In the above embodiments, the electromagnetic actuator 15 is used as the means for applying the drive force to the spool 12. Alternatively, any other electric actuator, such as a piezoelectric actuator or an electric motor, may be used, or a fluid pressure actuator may be used.

In the above embodiments, the present invention is implemented in the hydraulic pressure control apparatus, which controls the hydraulic pressure in the automatic transmission. Alternatively, the present invention may be implemented in a fluid pressure control apparatus, which controls a fluid pressure in an apparatus or system, which is other than the automatic transmission.

Additional advantages and modifications will readily occur to those skilled in the art. The invention in its broader terms is therefore not limited to the specific details, representative apparatus, and illustrative examples shown and described.

What is claimed is:

1. A fluid pressure control apparatus comprising:
   a spool valve that includes:
      a valve housing that has an input port, which receives a supply of fluid, and an output port, which is communicated with a control subject chamber;
      a spool that is movably supported in the valve housing and includes an input seal land, which is adapted to open or close the input port in response to movement of the spool; and a feedback chamber that is adapted to provide a force to the spool in a valve closing direction for closing the input port upon increasing of a pressure in the feedback chamber;

a valve opening direction drive means for providing a force to the spool in a valve opening direction for opening the input port;

a valve closing direction drive means for providing a force to the spool in the valve closing direction for closing the input port;

a negative pressure generating means for generating a localized negative pressure through use of a fluid velocity of fluid in a fluid passage, which extends from the input port to the control subject chamber, at a time of driving the spool in the valve opening direction with the valve opening direction drive means; and a negative pressure guide passage that guides the negative pressure, which is generated by the negative pressure generating means, to the feedback chamber to exert the negative pressure in the feedback chamber at the time of driving the spool in the valve opening direction, wherein:

the negative pressure generating means includes:

a locally defined constriction that locally constricts a flow passage cross sectional area in the fluid passage, and a negative pressure port that opens in a direction that is generally perpendicular to an imaginary line that extends along a surface of a notch of the locally defined constriction and in a flow direction of the fluid, wherein the negative pressure port opens at a location at which a fluid velocity of the fluid is accelerated by the constriction; and the negative pressure guide passage communicates between the negative pressure port and the feedback chamber.

2. The fluid pressure control apparatus according to claim 1, wherein:

at least one of the input seal land and the valve housing has the notch defined therein, which opens the input port by a small amount, at the time of driving the spool in the valve opening direction with the valve opening direction drive means;

the constriction is formed by a small communication path defined between the notch and the other of the input seal land and the valve housing, at the time of driving the spool in the valve opening direction with the valve opening direction drive means; and the negative pressure port opens immediately after the notch on a downstream side of the notch in a flow direction of the fluid, which flows from the notch toward the output port.

3. The fluid pressure control apparatus according to claim 2, wherein the negative pressure guide passage is formed inside the spool and communicates between the negative pressure port and the feedback chamber.

4. The fluid pressure control apparatus according to claim 1, wherein the constriction is adapted to create a flow of the fluid, which is directed to an area adjacent to the negative pressure port and has a fluid velocity required to exert the negative pressure in the feedback port.

5. The fluid pressure control apparatus according to claim 1, wherein the negative pressure port opens immediately downstream of the locally defined constriction.

6. The fluid pressure control apparatus according to claim 1, wherein a plane bisecting the locally defined constriction and parallel to a longitudinal axis of the spool intersects the negative pressure port.

* * * * *